United States Patent
Fujita et al.

(10) Patent No.: US 8,034,467 B2
(45) Date of Patent: Oct. 11, 2011

(54) MOISTURE-REACTIVE COMPOSITION AND ORGANIC ELECTROLUMINESCENT ELEMENT HAVING SAME

(75) Inventors: Jun Fujita, Tokyo (JP); Takashi Yamasaki, Tokyo (JP)

(73) Assignee: 3M Innovative Properties Company, St. Paul, MN (US)

(*) Notice: Subject to any disclaimer, the term of this patent is extended or adjusted under 35 U.S.C. 154(b) by 685 days.

(21) Appl. No.: 11/817,408

(22) PCT Filed: Feb. 17, 2006

(86) PCT No.: PCT/US2006/005860
§ 371 (c)(1),
(2), (4) Date: Aug. 13, 2008

(87) PCT Pub. No.: WO2006/093702
PCT Pub. Date: Sep. 8, 2006

(65) Prior Publication Data
US 2008/0303418 A1 Dec. 11, 2008

(30) Foreign Application Priority Data
Mar. 2, 2005 (JP) ................ 2005-057523

(51) Int. Cl.
*H01L 51/52* (2006.01)
*C08K 3/34* (2006.01)
*C08K 3/38* (2006.01)

(52) U.S. Cl. ............ 428/690; 428/917; 313/504; 528/4; 524/88

(58) Field of Classification Search .................. None
See application file for complete search history.

(56) References Cited

U.S. PATENT DOCUMENTS

| | | | |
|---|---|---|---|
| 4,425,387 A | 1/1984 | Graf et al. | |
| 4,822,350 A | 4/1989 | Ito et al. | |
| 5,107,175 A | 4/1992 | Hirano et al. | |
| 5,449,736 A * | 9/1995 | Cabasso et al. | 528/25 |
| 6,226,890 B1 | 5/2001 | Boroson et al. | |
| 7,923,480 B2 | 4/2011 | Fujita et al. | |
| 2005/0012090 A1* | 1/2005 | Gerlach | 257/40 |
| 2006/0022592 A1 | 2/2006 | Boroson | |

FOREIGN PATENT DOCUMENTS

| | | | |
|---|---|---|---|
| EP | 11209 A1 * | 5/1980 | |
| EP | 78044 A * | 5/1983 | |
| EP | 376 410 A2 | 7/1990 | |
| EP | 665 235 A1 | 8/1995 | |
| JP | 2004292714 A * | 10/2004 | |

* cited by examiner

Primary Examiner — Jennifer Chriss
Assistant Examiner — Andrew K Bohaty
(74) Attorney, Agent, or Firm — Elizabeth A. Gallo

(57) ABSTRACT

Disclosed herein is a moisture-reactive composition having a moisture-reactive polysiloxane having a main chain and one or more side chains, wherein the main chain and/or the one or more side chains has a group represented by the formula: $-MX_mY_n$; and wherein M is selected from the group consisting of a multivalent metal atom, B, and P=O; X is a hydrogen atom, a substituted or nonsubstituted alkyl, alkenyl or alkoxy group; Y is a substituted or nonsubstituted alkoxy, siloxy, carboxyl, or diketolate group; m is from 1 to 3; and n is from 0 to 2.

14 Claims, 1 Drawing Sheet

MOISTURE-REACTIVE COMPOSITION AND ORGANIC ELECTROLUMINESCENT ELEMENT HAVING SAME

FIELD OF THE INVENTION

The present invention relates to a transparent, flexible moisture-reactive composition and an organic electroluminescent (EL) element in which the composition is arranged as a moisture-trapping agent.

BACKGROUND

An organic EL element utilizes electroluminescence of an organic material and is formed by laminating an organic charge transport layer and an organic luminescent layer between an anode and a cathode. Much attention has been paid to organic EL elements as high-intensity luminescence by low voltage direct current driving may be obtained therewith. Moreover, organic EL elements can be formed out of solids making them useful in flexible displays.

Luminescence properties such as luminescence brightness, luminescence efficiency, and luminescence uniformity of an organic EL element are often deteriorated after being driven for long periods of time. Causes of such deterioration include: oxidation of the electrodes due to penetration of oxygen into the organic EL element; oxidation decomposition of the organic material caused by heat generated during driving of the element; and oxidation of the electrodes and modification of the organic material caused by moisture in the air which penetrates into the element. Luminescent properties may also be deteriorated by peeling at an interface of the organic EL element. Peeling may be caused by oxygen and moisture, or by heat which generates stress due to differences in thermal expansion coefficients of the components of the element.

In order to reduce deterioration of luminescent properties, many technologies for sealing an organic EL element have been investigated in order to prevent the element from being contacted with oxygen and moisture. For example, Japanese Unexamined Patent Publication (Kokai) No. 9-148066 discloses a method comprising covering a pixel area formed by arranging an organic EL element as shown in FIG. 1. The element comprises transparent electrode 3, organic functional layer 4, metal cathode electrode 5 on substrate 1, with sealing cap 2 having a water-absorbing agent 6 affixed to the inner wall thereof. The interior of the element is filled with nitrogen gas, and sealing cap 2 is fixed to substrate 1 with adhesive 7. For another example, Japanese Unexamined Patent Publication (Kokai) No. 7-169567 discloses a method comprising using an oxygen-absorbing agent in place of the water-absorbing agent.

Various substances have been examined as water-absorbing agents. In particular, alkaline earth metal oxides such as barium oxide (BaO) and calcium oxide (CaO) have been widely investigated because the oxides differ from such water-absorbing agents that physically adsorb water as silica gel and zeolite in that the oxides can surely catch water molecules by chemical reactions, and because the oxides do not release the water molecules at high temperature. These oxides, however, are in the form of particles which must be affixed in a recess inside of the organic EL element which undesirably adds to the thickness of the element. Alkaline earth metal oxides can be applied to a so-called bottom emission type display apparatus from which display light is taken out of the substrate 1 side. However, alkaline earth metal oxides are not suitable for use in so-called top emission type display apparatus from which display light is taken out of the sealing cap 2 side opposite to the substrate 1. This is because they are opaque and thereby hinder emission of the display light. If oxides are to be used, they must be arranged so as not to cover the pixel area, and a new arrangement site must be provided.

Several proposals have been made in order to apply a water-absorbing agent to a top emission type display apparatus. For example, transparent, water absorbing polymers such as poly(vinyl alcohol) and nylon may be used, although these polymers physically adsorb water, which is not satisfactory as explained above. Japanese Unexamined Patent Publication (Kokai) No. 2001-357973 describes an organic EL element having a top emission structure and an arrangement of a particulate water-absorbing agent to such a degree that light transmission is not hindered. Japanese Unexamined Patent Publication (Kokai) No. 2002-56970 describes use of a plastic substrate in which a water-absorbing agent having a particle size smaller than the luminescence wavelength of the organic EL element. However, because inorganic particles are utilized as water-absorbing agents in both references, the water-absorbing agents are hardly arranged, and the primary particles thereof are hardly dispersed. As a result, light is scattered which undesirably lowers light transmission.

Japanese Unexamined Patent Publication (Kokai) No. 2003-142256 discloses use of a water-trapping film that absorbs little visible light and can be formed by coating a specific metal compound with a solvent. However, when this water-trapping film is applied to a flexible substrate, problems arise because the film is formed out of a low molecular weight compound, and thus is not flexible. Furthermore, in order to protect the element from both moisture and oxygen, respective trapping agents must be used. As a result, the problem that the arrangement sites of these agents are still more restricted arises.

SUMMARY

Disclosed herein is a moisture-reactive composition comprising a moisture-reactive polysiloxane comprising a main chain and one or more side chains, wherein the main chain and/or the one or more side chains comprises a group represented by the formula:

and wherein M is selected from the group consisting of a multivalent metal atom, B, and P=O; X is a hydrogen atom, a substituted or nonsubstituted alkyl, alkenyl or alkoxy group; Y is a substituted or nonsubstituted alkoxy, siloxy, carboxyl, or diketolate group; m is from 1 to 3; and n is from 0 to 2.

DETAILED DESCRIPTION

Figure 1:
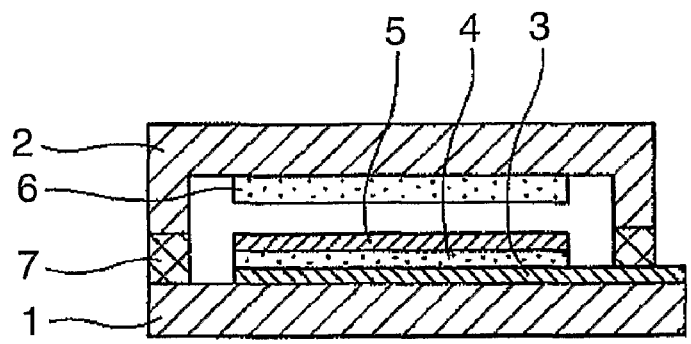
FIG. 1 is a schematic cross-sectional view of an exemplary organic EL element.

As described above, the moisture-reactive polysiloxane comprising a main chain and one or more side chains may be represented by the formula:

M is selected from the group consisting of a multivalent metal atom, B, and P=O. Preferably, M is independently selected from the group consisting of Al, B, Ti, and Zr, and more preferably Al or Ti.

X is a hydrogen atom, a substituted or nonsubstituted alkyl, alkenyl or alkoxy group. Useful alkyl groups comprise from 1 to 20 carbon atoms; examples include a methyl group, an ethyl group, a propyl group, a butyl group, a hexyl group, and an octyl group. Useful alkoxy groups comprise from 8 to 1,000 carbon atoms; examples include a methoxy group, an ethoxy group, a butoxy group, a hexyloxy group, a cyclohexyloxy group, an octyloxy group, a 2-ethylhexyloxy group, a decyloxy group, a lauryloxy group, a myristiloxy group, a cetyloxy group, an isostearyloxy group, an isobornyloxy group, a cholesteroxy group, a polyoxyalkylene monoalkyl ester group, or a polyoxyalkylene monoalkyl etheroxy group. X may also be a polyoxyethylene monolauryl esteroxy group, a polyoxyethylene monomethyl etheroxy group, a polyoxypropylene monobutyl etheroxy group, or a polytetrahydrofuran monomethyl etheroxy group. X may also be an alkoxy group comprising polydimethylsiloxane; examples include FM2221, FM2241 and FM2245, manufactured by Chisso Corporation.

Y is a substituted or nonsubstituted alkoxy, siloxy, carboxyl, or diketolate group, and preferably an alkylcarboxyl group, and more preferably 2-ethylhexyl carboxylate, isostearyl carboxylate, stearyl carboxylate, cyclohexyl carboxylate or a naphtlenyl caboxylate. Y is used to adjust the curing rate and the compatibility between the composition prior to curing and the composition after curing.

The moisture-reactive polysiloxane comprising a main chain and one or more side chains may be represented by the formula:

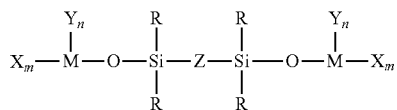

M, X, Y, m, and n are described above.

R is independently a hydrogen atom, a substituted or nonsubstituted linear or alicyclic alkyl or alkenyl group having from 1 to 20 carbon atoms, or a substituted or nonsubstituted aryl group having from 1 to 10 carbon atoms. R is preferably independently a hydrogen atom, a methyl group, an ethyl group, a butyl group, a hexyl group, an octyl group, a phenyl group, or a vinyl group, and is more preferably a methyl or phenyl group.

Z is a divalent polysiloxane linking group; preferably polydimethylsiloxane, polydiphenylsiloxane, polyphenylmethylsiloxane, or polytrifluoropropylmethylsiloxane, and more preferably polydimethylsiloxane or polyphenylmethylsiloxane. Practically, Z is commercially available as a polysiloxane having silanol groups at molecular terminals, for example, the polysiloxanes commercially available from GE Toshiba Silicones Co., Ltd. as YF3800, YF3057, YF3897, YF3804. Although the molecular weight of the polysiloxane can be suitably selected according to the physical properties of the composition, it is generally from 200 to 3,000,000.

The moisture-reactive polysiloxane has a metal portion (—MX—) and a silanol group portion (—Si—O—). The metal portion quickly reacts with water and oxygen, and the silanol group portion adjusts the reactivity, fluidity, flexibility and compatibility of the compound. The moisture-reactive polysiloxane is formed by the reaction of a metal compound or a Lewis base addition product of the metal compound with a polysiloxane having a silanol group. The reaction is achieved by mixing both substances. Both substances are mixed in such a proportion that entire consumption of the portion of the metal compound that reacts with moisture, namely, $X_mY_n$, by the silanol group is avoided.

For example, the case wherein M is Al, X is an octyl group, and Y is not present, that is, n is 0, is explained below. The moisture-reactive polysiloxane is prepared by reacting a polysiloxane having a silanol group with trioctylaluminum, as shown by the following formula:

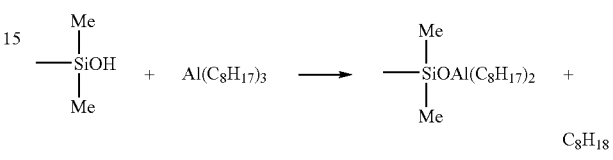

An alkylmetal compound MX, such as trioctylaluminum, can be synthesized by reacting a metal halide with a Grignard reagent, or the like procedure. Moreover, for example, when an alkylaluminum compound is to be synthesized, it can be synthesized by reacting triisobutylaluminum with an olefin. Examples of commercially available alkylaluminum compounds (from Tosoh Finechem Corporation or Nippon Aluminum Alkyls, Ltd.) include: trimethylaluminum, triethylaluminum, tripropylaluminum, tributylaluminum, trihexylaluminum, trioctylaluminum, diisobutylaluminum hydride and diethylaluminum ethoxide.

An alkoxymetal compound can be synthesized by a procedure by reacting a metal halide with a metal alkoxide, or a procedure by reacting an alkylmetal compound as mentioned above with oxygen or an alcohol.

A metal compound having Y can be synthesized by adding an alcohol, a silanol and a carboxylic acid, and the like, to the alkylmetal compound or alkoxymetal compound obtained by the above procedure.

The moisture-reactive polysiloxane thus produced by the above procedure traps a water molecule by chemically reacting with moisture, as shown by the following formula:

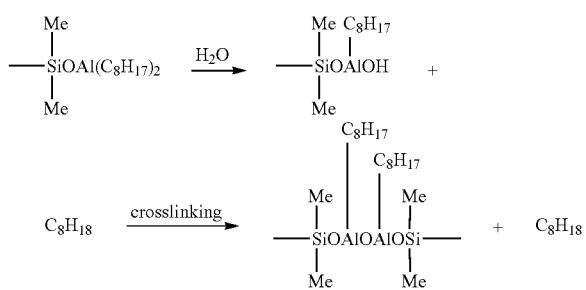

Group X bonded to metal is then released. Because group X (X is an octyl group in the formula) is inactive, it does not corrode electrodes, etc., within the EL element. Moreover, when the moisture-reactive polysiloxane is used in an organic EL element, group X having a large number of carbon atoms is preferably used because a volatile component formed by the reaction with moisture would otherwise influence the element.

Furthermore, when X is an alkyl group, the compound reacts with not only moisture but also oxygen. As a result, the compound can also be used as an oxygen-trapping agent. The reaction proceeds as shown by the following formula:

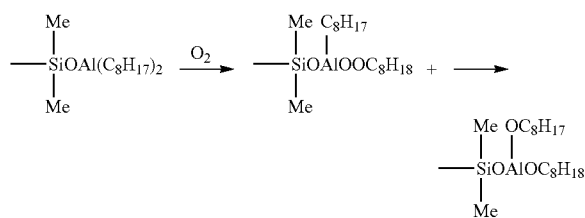

The moisture reactive composition disclosed herein may contain an unreacted metal compound in addition to the above silicone compound. The proportion in terms of mass of the metal compound to the silicone compound is desirably from 1,000:1 or less. When the proportion is larger than 1,000:1, the moisture reactive composition sometimes has no sufficient strength as a film, or phase separation may take place after absorption of moisture, which may reduce transparency of the film.

Moreover, the moisture reactive composition may also contain a polysiloxane containing no silanol group and a filler in addition to the above silicone compound, in order to adjust the physical properties of the cured material and the viscosity of the noncured material. The polysiloxane containing no silanol group may be a polysiloxane having a hydrogen atom; a substituted or nonsubstituted alkyl, allyl or aryl group; or a copolymer of the polysiloxane. Specifically, polydimethylsiloxane, polydiphenylsiloxane, polymethylphenylsiloxane, and the like, can be employed. The filler is preferably inorganic and has a hydroxyl group capable of reacting with the above metal compound. Examples of the filler include metal oxides such as silica, titanium oxide, zinc oxide, aluminum oxide and zirconium oxide; nitrides such as boron nitride and aluminum nitride; clays such as montmorillonite; and carbon black.

The moisture reactive composition may comprise particles having any particle size as long as transparency is not impaired, and is generally from 1 to 1,000 nm.

As described above, the moisture reactive composition can be used as a moisture-trapping agent for an organic EL element. In particular, the organic EL element may comprise a laminate comprising: a pair of mutually opposing electrodes, and an organic luminescent material layer comprising an organic material, the organic luminescent material layer disposed between the pair of mutually opposing electrodes; a sealing structure that shields the laminate from the outside air; and a moisture reactive composition comprising a transparent moisture reactive material, the moisture reactive composition disposed within the sealing structure.

The moisture reactive composition may be positioned anywhere within the element because it is transparent and thus does not shield light. FIG. 1 shows an exemplary organic EL element comprising a laminate comprising transparent electrode 3, organic functional layer 4, and metal cathode electrode 5. The laminate is disposed within a sealing structure created by substrate 1, sealing cap 2, and adhesive 7. The sealing structure has a light receiving face side which faces the laminate, upon which moisture reactive composition 6 may be disposed. Alternatively, moisture reactive composition 6 may be disposed on the outer face of metal cathode electrode 5 which constitutes a luminescent face side.

Figure 2:
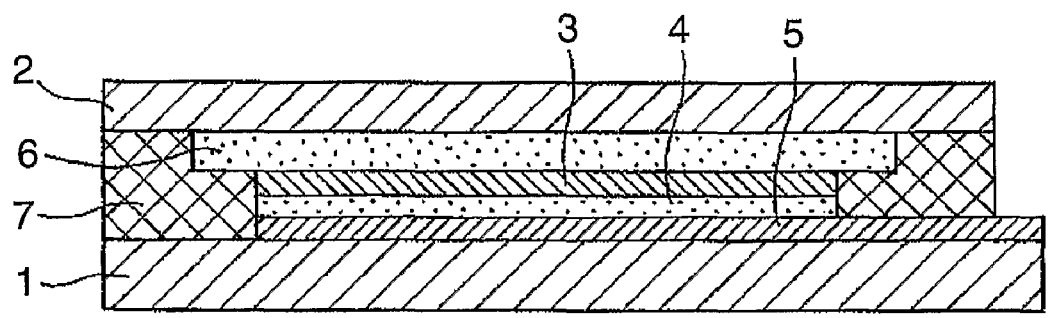
FIG. 2 is a schematic cross-sectional view of an exemplary organic EL element.
Figure 3:
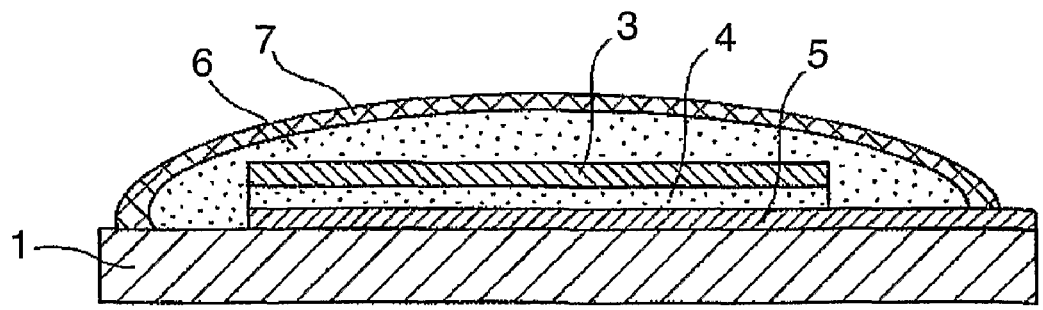
FIG. 3 is a schematic cross-sectional view of an exemplary organic EL element.

FIG. 2 shows an exemplary organic EL element wherein moisture reactive composition 6 may be simultaneously affixed to the luminescent and light receiving face sides. FIG. 3 shows another exemplary organic EL element wherein moisture reactive composition 6 completely covers the laminate.

The organic EL element described above may comprise the transparent moisture reactive material comprising a moisture-reactive polysiloxane comprising a main chain and one or more side chains, wherein the main chain and/or the one or more side chains comprise a group represented by the formula:

$$-MX_mY_n;$$

and wherein: M is selected from the group consisting of a multivalent metal atom, B, and P=O; X is a hydrogen atom, a substituted or nonsubstituted alkyl, alkenyl or alkoxy group; Y is a substituted or nonsubstituted alkoxy, siloxy, carboxyl, or diketolate group; m is from 1 to 3; and n is from 0 to 2.

Also disclosed herein is a hygroscopic laminate film comprising a moisture reactive material, the transparent moisture reactive material comprising a polysiloxane comprising a main chain and one or more side chains, wherein the main chain and/or the one or more side chains comprise a group represented by the formula:

$$-MX_mY_n;$$

and wherein: M is selected from the group consisting of a multivalent metal atom, B, and P=O; X is a hydrogen atom, a substituted or nonsubstituted alkyl, alkenyl or alkoxy group; Y is a substituted or nonsubstituted alkoxy, siloxy, carboxyl, or diketolate group; m is from 1 to 3; and n is from 0 to 2.

EXAMPLE A

Materials
The following polymers were used:
Polymer 1: GE Toshiba Silicones Co., Ltd., YF3807, viscosity of 20,000 $mm^2$/s, OH group terminals sealed
Polymer 2: GE Toshiba Silicones Co., Ltd., YF3802, viscosity of 80,000 $mm^2$/s, OH group terminals sealed
Polymer 3: GE Toshiba Silicones Co., Ltd., YF3897, Gum, OH group terminals sealed
Polymer 4: Azmax Co., Ltd., DMS-S 12, viscosity of 30 $mm^2$/s, OH group terminals sealed
Polymer 5: Azmax Co., Ltd., DMS-S31, viscosity of 1,000 $mm^2$/s, OH group terminals sealed
Polymer 6: GE Toshiba Silicones Co., Ltd., TSF451 1M viscosity of 10,000 $mm^2$/s
Polymer 7: GE Toshiba Silicones Co., Ltd., TSF451 100M viscosity of 1,000,000 $mm^2$/s
Polymer 8: GE Toshiba Silicones Co., Ltd., YF3804, viscosity of 80 $mm^2$/s, OH group terminals sealed
Polymer 9: Azmax Co., Ltd., FMS-9921, viscosity of 40-150 $mm^2$/S, OH group terminals sealed
The following compounds were used:
Compound 1: trioctylaluminum, Sigma Aldrich Co., Ltd.
Compound 2: Chelope EP-12, aluminum diisopropoxyacetylacetonate, Hope Chemical Co., Ltd.
Compound 3: Liquid Oliepe AOO, aluminum oxide octylate, Hope Chemical Co., Ltd.
Compound 4: Aerosil® RY 200, silica filler, Japan Aerosil Co., Ltd.
Compound 5: tri(2-octyldodecyloxy)aluminum (synthesis described below)
Compound 6: tri(polydimethylsiloxaneoxy)aluminum (synthesis described below)
Compound 7: tri(polypropylene glycol monobutyletheroxy)aluminum (synthesis described below)

Compound 8: triethyl borate, Sigma Aldrich Co., Ltd.
Compound 9: Orgatix TA-30, tetra(2-ethylhexyl) titanate, Matsumoto Trading Co., Ltd.
Compound 10: Orgatix ZB-320, zirconium tributoxystearate, Matsumoto Trading Co., Ltd.

Synthesis of Compound 5 (tri(2-octyldodecyloxy)aluminum)

A toluene solution containing 25% of triisopropylaluminum (manufactured by Sigma Aldrich Co., Ltd.) was placed with a syringe in an amount of 20 g in a 200-ml Schlenk tube having been purged with nitrogen. Moreover, 20.5 g of 2-octyldodecanyl alcohol (Kalcol® 200GD, manufactured by Kao Corporation) was gradually added to the toluene solution. Heat generation and bubbling of butane were obtained, and a colorless transparent solution was observed. The product was not taken out, and the solution was used for preparing a moisture-reactive composition without further processing.

Synthesis of Compound 6 (tri(polydimethylsiloxaneoxy)aluminum)

The procedure in the synthesis of Compound 5 was repeated except that 16 g of a 25% toluene solution of triisopropylaluminum (manufactured by Sigma Aldrich Co., Ltd.) and 5.0 g of an alcohol having a polydimethylsiloxane skeleton (Silaplaine FM0411, manufactured by Chisso Corporation) were used to give a colorless transparent solution.

Synthesis of Compound 7 (tri(propylene glycol monobutyl etheroxy)aluminum)

The procedure in the synthesis of Compound 5 was repeated except that 20 g of a 25% toluene solution of triisopropylaluminum (manufactured by Sigma Aldrich Co., Ltd.) and 2.0 g of polypropylene glycol monobutyl ether (manufactured by Sigma Aldrich Co., Ltd.) were used to give a colorless transparent solution.

Example 1

A polydimethylsiloxane (YT3807, manufactured by GE Toshiba Silicones Co., Ltd.) having a silanol group at both terminals was added in an amount of 4.0 g to a hexane solution of 4.0 g of trioctylaluminum (manufactured by Sigma Aldrich Co., Ltd.) in a 20-ml screw tube, and the contents were drastically stirred to give a solution composition.

Examples 2 to 17

Solution compositions were obtained using materials as shown in Tables 1 and 2 and in the same manner as in Example 1. In addition, a fluorine type solvent (3M™ Novec™ HFE-7200, manufactured by Sumitomo 3M, Ltd.) was used in Example 17.

Comparative Examples 1 to 4

Solution compositions were obtained from materials as shown in Tables 1 and 2 and in the same manner as in Example 1.

TABLE 1

| | Polymer | | | | | | | | |
|---|---|---|---|---|---|---|---|---|---|
| Example | 1 | 2 | 3 | 4 | 5 | 6 | 7 | 8 | 9 |
| 1 | 80 | | | | | | | | |
| 2 | | 80 | | | | | | | |
| 3 | | | 80 | | | | | | |
| 4 | | | | 20 | | | | | |
| 5 | | | | | 80 | | | | |
| 6 | 45 | | | | | | 45 | | |

TABLE 1-continued

| | Polymer | | | | | | | | |
|---|---|---|---|---|---|---|---|---|---|
| Example | 1 | 2 | 3 | 4 | 5 | 6 | 7 | 8 | 9 |
| 7 | 80 | | | | | | | | |
| 8 | 50 | | | | | | | | |
| 9 | 50 | | | | | 25 | | | |
| 10 | 40 | | | | | | | | |
| 11 | | | 20 | | | | | | |
| 12 | 20 | | | | | | | | |
| 13 | 80 | | | | | | | | |
| 14 | 20 | | | | | | | | |
| 15 | 20 | | | | | | | | |
| 16 | | | | | | | 10 | | |
| 17 | | | | | | | | | 10 |
| Comparative 1 | | | | | | | | | |
| Comparative 2 | | | | | | | | | |
| Comparative 3 | | | | | | | 80 | | |
| Comparative 4 | | | | | | | 50 | | |

TABLE 2

| | Compound | | | | | | | | | |
|---|---|---|---|---|---|---|---|---|---|---|
| Example | 1 | 2 | 3 | 4 | 5 | 6 | 7 | 8 | 9 | 10 |
| 1 | 20 | | | | | | | | | |
| 2 | 20 | | | | | | | | | |
| 3 | 20 | | | | | | | | | |
| 4 | 80 | | | | | | | | | |
| 5 | 20 | | | | | | | | | |
| 6 | 10 | | | | | | | | | |
| 7 | | 20 | | | | | | | | |
| 8 | | | 50 | | | | | | | |
| 9 | 20 | | | | 5 | | | | | |
| 10 | | | | | 80 | | | | | |
| 11 | | | | | | 80 | | | | |
| 12 | | | | | | | 80 | | | |
| 13 | | | | | | | | 20 | | |
| 14 | | | | | | | | 80 | | |
| 15 | | | | | | | | | | 80 |
| 16 | | | | | 74 | | | | | |
| 17 | | | | | | 90 | | | | |
| Comp. 1 | 100 | | | | | | | | | |
| Comp. 2 | | | 100 | | | | | | | |
| Comp. 3 | 20 | | | | | | | | | |
| Comp. 4 | | | | | 50 | | | | | |

Measurement of Hygroscopicity

One of the solution compositions mentioned above was placed in a commercially available polypropylene-made tray, 100 mm (inner diameter)×70 mm, in an amount of 1 g (as solid after drying), and the solvent was distilled off under reduced pressure. The sample thus obtained on the tray was placed in a glass bottle having a volume of 420 ml together with the tray, and the bottle was immediately closed with a metal-made cap on which a temperature and humidity meter (trade name of 605-H1, manufactured by Testo Co., Ltd.) was mounted. The time required until the relative humidity (RH) within the bottle lowered by 10% and the RH after 12 hours were measured. The room temperature was 25° C. Table 3 shows the measurement results.

Measurement of Permeability

The permeability of samples was measured with Spectrophotometer U 4000 (trade name, manufactured by Hitachi Ltd.). A sample for the measurement was prepared by coating a commercially available poly(ethylene terephthalate) (PET) film (Lumirror® T 60, 50 μm thick, manufactured by Toray Industries, Inc.) with one of the above solution compositions in a nitrogen atmosphere using a knife coater. The film thickness after drying was 50 μm. A sample, 30 mm×40 mm, was cut out of the film thus obtained, and allowed to stand for 3 days in the air at 25° C. and a relative humidity of 50% to be adequately cured. In the analysis, the PET film was used as a baseline. Table 3 shows the transparency in the wavelength region of 400 to 800 nm.

Measurement of Flexibility

The film used above was bent along an iron bar (R=10 mm) and was visually observed. The number of bendings required to crack each of the films is tabulated in Table 3. A maximum of 10 bendings was carried out.

TABLE 3

| Example | Time until RH lowered by 10% (min) | RH after 12 hours | Transparency | Number of bending |
|---|---|---|---|---|
| 1 | 4 | <1% | 98% | >10 |
| 2 | 4 | <1% | 97% | >10 |
| 3 | 3 | <1% | 98% | >10 |
| 4 | 2 | 2% | 98% | >10 |
| 5 | 4 | <1% | 98% | >10 |
| 6 | 5 | <1% | 98% | >10 |
| 7 | 10 | 3% | 95% | >10 |
| 8 | 5 | 4% | 96% | >10 |
| 9 | 5 | 1.5% | 90% | >10 |
| 10 | 8 | <1% | 95% | >10 |
| 11 | 6 | <1% | 91% | >10 |
| 12 | 12 | 4% | 90% | >10 |
| 13 | 4 | 2% | 95% | >10 |
| 14 | 5 | 2% | 94% | >10 |
| 15 | 6 | 2% | 92% | >10 |
| 16 | 8 | <1% | 95% | >10 |
| 17 | 8 | <1% | 95% | >10 |
| Comp. 1 | 5 | <1% | Crack formation | Broken by one bending |
| Comp. 2 | 3 | <1% | Crack formation | Broken by one bending |
| Comp. 3 | — | 5% | Chalked | >10 |
| Comp. 4 | — | 5% | Chalked | >10 |

The following are evident from the results shown in Table 3. The compositions in Examples 1 to 17 are adequately moisture reactive, and can be used as moisture-trapping agents. Moreover, films formed out of the compositions have sufficient flexibility and transparency in the visible light region. On the other hand, the compositions in Comparative Examples 1 and 2 are very brittle after absorbing moisture, and are hardly bent. Moreover, although the compositions are transparent directly after applying the compositions, they are chalked 12 hours after leaving them. The compositions in Comparative Examples 3 and 4 show poor transparency, and are in a liquid state because they are not cured even when they absorbed moisture.

EXAMPLE B

Example 18

FIG. 1 shows an organic EL element that was prepared as follows. A glass substrate was used as the substrate 1, and a glass substrate with an indium tin oxide (ITO) film (manufactured by Sanyo Vacuum Industries Co., Ltd., ITO film thickness of 150 nm, sheet resistance <14 ohm/sq, glass thickness of 0.7 mm, dimension of 40 mm×40 mm) was patterned by photolithography to form an ITO electrode pattern as the electrode 3. The substrate was surface cleaned by solvent cleaning, and the organic functional layer 4 and the metal electrode layer 5 were formed on the ITO electrode 3 by vacuum deposition. The vacuum deposition rate and the thickness of the vacuum deposition layer were monitored with a film thickness sensor (trade name of IC6000, manufactured by Infinicon Systems). The background pressure of the vacuum bath was about $1 \times 10^7$ torr.

The organic functional layer 4 was formed out of three types of organic low molecular weight materials shown below, and the total film thickness was 130 nm. First, a copper phthalocyanine (CuPc) layer 15 nm thick was formed on the ITO electrode 3 by vapor deposition as a hole injection layer. A bis[N-(1-naphthyl)-N-phenyl]benzidine (NPD) layer 55 nm thick was then formed on the CuPc layer by vapor deposition as a hole transport layer. A tris(8-hydroxyquinolinato) aluminum (III) (Alq3) layer 60 nm thick was then formed on the NPD layer by vapor deposition as an electron transport and emission layer. The vapor deposition rate of all the materials was about 3 Å/sec. All these organic materials were manufactured by Nippon Steel Chemical Co., Ltd.

The metal electrode layer 5 was formed on the Alq3 layer by vacuum vapor deposition. The metal electrode layer 5 was formed out of the two types of inorganic materials explained below, and the total layer thickness was 101 nm. First, a lithium fluoride (purity of 99.99%, manufactured by Furuuchi Chemical Corporation) layer 1 nm thick was formed by vapor deposition as an electron injection layer. An aluminum (purity of 99.99%, manufactured by Kojundo Kasei K.K.) layer 100 nm thick was then formed on the lithium fluoride layer as an electrode metal. The vapor deposition rate of lithium fluoride was about 0.3 Å/sec, and that of aluminum was about 5 Å/sec.

Next, the interior of the recessed portion of the sealing cap 2 (made of glass, having an outside dimension of 40 mm×40 mm and a thickness of 3 mm, the interior of the recessed portion having a dimension of 40 mm×40 mm and a depth of 1.5 mm) was coated with a solution containing 62.5% by weight of the composition of Example 1, in an inert atmosphere of a nitrogen gas from which moisture and oxygen were removed as much as possible, and dried. A transparent film of the moisture-reactive composition about 0.5 mm thick was thus formed within the sealing cap 2 as the water-absorbing agent 6 (as drying means).

The sealing member and the organic EL element were opposed to each other in an inert atmosphere of a nitrogen gas from which moisture and oxygen were removed as much as possible, and the organic EL element was sealed by applying a two liquid type curable epoxy resin (Bond Quick 5, manufactured by Konishi Co., Ltd.) as the adhesive 7, and drying.

The organic EL element was subjected to a storage test in the air at 25° C. and a relative humidity of 50%. First, the organic EL element subsequent to sealing was taken out in the air from the inert atmosphere. The ITO electrode 3 was used as an anode, and the metal electrode 5 was used as a cathode; the organic EL element was observed with an optical microscope (trade name of BX60, manufactured by Olympus Corporation) connected to a CCD camera while a DC voltage of about 9 V was being applied to the electrodes, and the proportion of the initial nonluminescent area to the luminescent portion was calculated from the luminescent photograph image of the organic EL element taken. No nonluminescent portion was observed in the organic EL element of Example 18.

Next, the organic EL element was stored in the air at 25° C. and a relative humidity of 50% for 3,600 hours, and the proportion of a nonluminescent area was calculated by the same procedure as in the calculation of an initial nonluminescent area. The luminescent area of the organic EL element in Example 18 after storing for 3,600 hours was identical to the initial luminescent area, and the increasing rate of a nonluminescent area was 0%. The results show that the composition of Example 1 effectively traps moisture and oxygen that would otherwise penetrate into the organic EL element.

Comparative Example 5

An organic EL element was prepared in the same manner as in Example 18 except that the composition of Example 1 was not used. The initial luminescent area of the organic EL element was measured by the same procedure as in Example 18. The proportion of the initial nonluminescent area in the organic EL element in Comparative Example 5 was 3.1%. That is, the organic EL element was deteriorated immediately after sealing. The organic El element was then stored in the air at 25° C. and a relative humidity of 50% for 3,600 hours, and the proportion of a nonluminescent portion after storing was calculated by the same procedure as in Example 18. The proportion of the nonluminescent area in the organic El element of Comparative Example 5 after storing for 3,600 hours was 91.3%. The increasing rate of the nonluminescent area was as very high as 295%. The results show that moisture and oxygen penetrated into the sealing cap through the sealing adhesive 7 to deteriorate the organic EL element.

Comparative Example 6

An organic El element was prepared in the same manner as in Example 18 except that BaO (particulate, purity of 99.9%, manufactured by Furuuchi Chemical Corporation) was used instead of the composition of Example 1. BaO particles were adequately ground in a mortar, and the resultant particles were fixed to the recessed portion of the sealing cap 2 with a double-coated tape (trade name of ST 415, manufactured by Sumitomo 3M Ltd.). The initial luminescent area of the organic EL element was measured by the same procedure as in Example 18. The proportion of the initial nonluminescent area in the organic EL element in Comparative Example 6 was 0.1%. The organic El element was stored in the air at 25° C. and a relative humidity of 50% for 3,600 hours, and the proportion of a nonluminescent portion after storing was calculated by the same procedure as in Example 18. The proportion of the nonluminescent area in the organic EL element of Comparative Example 6 after storing for 3,600 hours was 0.1%. The increasing rate of the nonluminescent area was 0%, which was the same as that in Example 18.

Comparative Example 7

An organic EL element was prepared in the same manner as in Example 18 except that aluminum oxide octylate (AOO) (trade name of Liquid Oliepe AOO, manufactured by Hope Chemical Co., Ltd.) was used instead of the composition of Example 1. The recessed internal portion of the sealing cap 2 was coated with a solution containing 48% by weight of AOO in an inert atmosphere of a nitrogen gas from which moisture and oxygen were removed as much as possible, and dried. The AOO film was about 0.5 mm thick after drying. The initial luminescent area of the organic EL element was measured by the same procedure as in Example 18. The proportion of the initial nonluminescent area in the organic EL element in Comparative Example 7 was 0.4%. The organic El element was then stored in the air at 25° C. and a relative humidity of 50% for 3,600 hours, and the proportion of a nonluminescent portion after storing was calculated by the same procedure as in Example 18. The proportion of the nonluminescent area in the organic EL element of Comparative Example 7 after storing for 3,600 hours was 6.5%. The increasing rate of the nonluminescent area was 163%, which was larger than that in Example 18.

What is claimed is:
1. An organic EL element comprising:
a laminate comprising:
a pair of mutually opposing electrodes, and
an organic luminescent material layer comprising an organic material, the organic luminescent material layer disposed between the pair of mutually opposing electrodes;
a sealing structure that shields the laminate from the outside air; and
a moisture reactive composition disposed within the sealing structure, the moisture reactive composition comprising a moisture-reactive polysiloxane comprising a main chain and one or more side chains, wherein the main chain and/or the one or more side chains comprise a group represented by the formula:

$$-MX_mY_n;$$

and wherein:
M is selected from the group consisting of a multivalent metal atom, B, and P=O;
X is a hydrogen atom, or a substituted or nonsubstituted alkyl, alkenyl or alkoxy group;
Y is a substituted or nonsubstituted alkoxy, siloxy, carboxyl, or diketolate group;
m is from 1 to 3; and
n is from 0 to 2.
2. The organic EL element of claim 1, the sealing structure comprising a light receiving face side, the light receiving face side facing the laminate, wherein the moisture reactive composition is disposed adjacent the light receiving face side.
3. The organic EL element of claim 1, wherein one of the mutually opposing electrodes comprises an outer luminescent face side of the laminate, and wherein the moisture reactive composition is disposed adjacent the luminescent face side.
4. The organic EL element of claim 1, wherein X is an alkyl group comprising 1 to 20 carbon atoms.
5. The organic EL element of claim 1, wherein X is an alkoxy group comprising 8 to 1,000 carbon atoms.
6. The organic EL element of claim 1, wherein the X is a methoxy group, an ethoxy group, a butoxy group, a hexyloxy group, a cyclohexyloxy group, an octyloxy group, a 2-ethylhexyloxy group, a decyloxy group, a lauryloxy group, a myristiloxy group, a cetyloxy group, an isostearyloxy group, an isobornyloxy group, a cholesteroxy group, a polyoxyalkylene monoalkyl ester group, or a polyoxyalkylene monoalkyl etheroxy group.
7. The organic EL element of claim 1, wherein the moisture reactive composition comprises a polysiloxane having no silanol groups and an inorganic filler, wherein the inorganic filler is a metal oxide, a nitride, a clay, or carbon black.
8. The organic EL element of claim 1, wherein the composition comprises particles having a particle size from 1 to 1,000 nm.
9. The organic EL element of claim 5, wherein X is a polyoxyethylene monolauryl esteroxy group, a polyoxyethylene monomethyl etheroxy group, a polyoxypropylene monobutyl etheroxy group, or a polytetrahydrofuran monomethyl etheroxy group.

10. The organic EL element of claim 5, wherein X is an alkoxy group comprising polydimethylsiloxane.

11. The organic EL element of claim 1, wherein Y is an alkylcarboxyl group, 2-ethylhexyl carboxylate, isostearyl carboxylate, stearyl carboxylate, cyclohexyl carboxylate, or naphthenyl caboxylate.

12. The organic EL element of claim 1, wherein the moisture-reactive polysiloxane is represented by the formula:

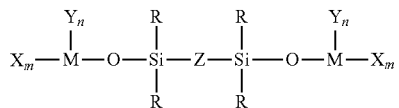

wherein:
R is independently a hydrogen atom, a substituted or nonsubstituted linear or alicyclic alkyl or alkenyl group having from 1 to 20 carbon atoms, or a substituted or nonsubstituted aryl group having from 1 to 10 carbon atoms; and
Z is a divalent polysiloxane linking group.

13. The organic EL element of claim 12, wherein Z comprises polydimethylsiloxane, polydiphenylsiloxane, polyphenylmethylsiloxane, or polytrifluoropropylmethylsiloxane.

14. The organic EL element of claim 12, wherein Z has a molecular weight from 200 to 3,000,000.

* * * * *